US012754490B2

(12) United States Patent
Watanabe

(10) Patent No.: US 12,754,490 B2
(45) Date of Patent: Oct. 6, 2026

(54) ELECTROSTATIC IMAGE DEVELOPMENT TONER

(71) Applicant: ZEON CORPORATION, Tokyo (JP)

(72) Inventor: Masashi Watanabe, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 857 days.

(21) Appl. No.: 17/762,997

(22) PCT Filed: Sep. 24, 2020

(86) PCT No.: PCT/JP2020/036124
§ 371 (c)(1),
(2) Date: Mar. 23, 2022

(87) PCT Pub. No.: WO2021/060408
PCT Pub. Date: Apr. 1, 2021

(65) Prior Publication Data
US 2022/0413410 A1 Dec. 29, 2022

(30) Foreign Application Priority Data
Sep. 24, 2019 (JP) ................................ 2019-172442

(51) Int. Cl.
*G03G 9/097* (2006.01)

(52) U.S. Cl.
CPC ................................ *G03G 9/09733* (2013.01)

(58) Field of Classification Search
CPC ................................................ G03G 9/09733
See application file for complete search history.

(56) References Cited

U.S. PATENT DOCUMENTS 5,679,492 A * 10/1997 Chamberlain ......... G03G 9/135 430/118.6
2004/0132920 A1* 7/2004 Matsumura ........ G03G 9/08795 525/418
2010/0248119 A1* 9/2010 Young ................ G03G 9/08753 430/108.4
2011/0104604 A1* 5/2011 Hayashi ............. G03G 9/08755 430/108.1
2011/0106604 A1* 5/2011 Reuthe ............... G06Q 30/0222 705/14.23

(Continued)

FOREIGN PATENT DOCUMENTS

GB 1477504 A * 6/1977 ......... G03G 9/08793
JP 2004-295065 A 10/2004
JP 2010-85841 A 4/2010

(Continued)

OTHER PUBLICATIONS

JP-2010085841-A (Year: 2024).*

(Continued)

*Primary Examiner* — Amber R Orlando
*Assistant Examiner* — Charles Collins Sullivan, IV
(74) *Attorney, Agent, or Firm* — WHDA, LLP

(57) ABSTRACT

Provided is an electrostatic image development toner comprising colored resin particles and an external additive, the colored resin particles containing a binder resin, a colorant, an aromatic vinyl thermoplastic elastomer having a polymerizable unsaturated bond, and a release agent, wherein the release agent is an ester compound having a glycerol skeleton.

16 Claims, 1 Drawing Sheet

1 μm

(56) References Cited

U.S. PATENT DOCUMENTS

| | | | |
|---|---|---|---|
| 2020/0233326 | A1 | 7/2020 | Yagyu |

FOREIGN PATENT DOCUMENTS

| | | | | |
|---|---|---|---|---|
| JP | 2010085841 | A | * | 4/2010 |
| JP | 2012163800 | A | * | 8/2012 |
| WO | 2019065868 | A1 | | 4/2019 |

OTHER PUBLICATIONS

JP-2012163800-A (Year: 2025).*
JP-2012163800-A Translation (Year: 2025).*
International Search Report dated Dec. 8, 2020, issued in counterpart application No. PCT/JP2020/036124 (2 pages).
International Preliminary Report on Patentability (Form PCT/IB/373) issued in counterpart International Application No. PCT/JP2020/036124 dated Mar. 15, 2022, with Form PCT/ISA/237. (4 pages).

* cited by examiner

1 μm

1 μm

ELECTROSTATIC IMAGE DEVELOPMENT TONER

TECHNICAL FIELD

The present invention relates to an electrostatic image development toner used for developing electrostatic latent images in electrophotography, electrostatic recording, electrostatic printing, and the like.

BACKGROUND ART

A method of forming an electrostatic latent image on a photosensitive member and developing the electrostatic latent image with an electrostatic image development toner into a desired image has been widely used in image forming apparatuses such as electrophotographic apparatuses, electrostatic recording apparatuses, and electrostatic printing apparatuses, and such apparatuses are applied to copiers, printers, fax machines, multifunction machines thereof, and the like.

For example, in an electrophotographic apparatus using electrophotography, usually, the surface of a photosensitive member composed of a photoconductive substance is uniformly charged with a variety of means, and an electrostatic latent image is formed on the photosensitive member. The electrostatic latent image is then developed with (a) toner(s) (developing step), and the resulting toner image is transferred onto a recording material such as paper as needed (transferring step). The toner(s) is/are fixed onto the recording material by heating or the like (fixing step) to obtain a printed material.

Among these steps for image formation, the fixing step usually requires heating of a fixing roll to 150° C. or more during fixing, leading to a large amount of consumption of electricity as an energy source. To this, recent demands for energy saving and higher speed printing of the image forming apparatus have been increasing, and accompanied by this, there has been a demand for design of a toner which can maintain a high fixing rate even if the fixing temperature is reduced (toner having excellent low-temperature fixing properties).

To such demands, methods of reducing the glass transition temperature (Tg) of a toner, methods of adding a low melting point resin and/or a low molecular weight resin to a toner, methods of adding a low softening point substance (release agent) having releasing properties (peeling properties), such as a wax, to a toner, and the like are proposed.

However, for a toner having enhanced low-temperature fixing properties, the setting temperature of the fixing roll during fixing can be reduced while fusion (blocking (aggregation)) of toner particles is readily caused when the toner is used under a high temperature or is left (stored) for a long time, and may lead to a reduction in storage properties of the toner in some cases. For this reason, there has been a demand for development of toners which are designed in consideration of storage properties incompatible with low-temperature fixing properties such that the low-temperature fixing properties are improved without impairing the storage properties, and thus power consumption can be reduced.

For example, Patent Document 1 discloses an electrostatic image development toner containing toner particles comprising at least a binder resin, a colorant, a charge control agent, and a release agent, wherein the volume average particle size (Dv) of the toner particles is 3 to 10 μm, the ratio (Dv/Dp) of the volume average particle size to the number average particle diameter (Dp) is 1 to 1.3, and the average circularity is 0.93 to 0.995; in observation of a photograph of toner particle cross-sections taken with an electronic microscope after the toner particles are embedded in a resin and a slice is cut out, among the toner particle cross-sections containing an island-shaped separate phase and having a toner particle size 0.6 to 1.2 times the volume average particle size, 25% by number or more of the toner particle cross-sections contain an island-shaped separate phase which has a maximum diameter of 1 μm or more and an outermost portion present in a depth 0.01 to 0.15 times the toner particle size from the toner particle surface.

RELATED ART DOCUMENT

Patent Document

Patent Document 1: JP 2004-295065 A

SUMMARY OF THE INVENTION

Problem to be Solved by the Invention

However, while the technique according to Patent Document 1 aims at improving storage stability and hot offset resistance by use of the above configuration, it does not ensure sufficient low-temperature fixing properties.

The present invention has been made in consideration of such circumstances, and an object of the present invention is to provide an electrostatic image development toner having excellent low-temperature fixing properties, high storage stability, and high hot offset resistance, and enabling suppression of generation of ultrafine particles (UFPs).

Means for Solving Problems

The present inventor, who has conducted extensive research to achieve the above object, has found that if in an electrostatic image development toner comprising colored resin particles containing a binder resin, a colorant, and a release agent and an external additive, an aromatic vinyl thermoplastic elastomer having a polymerizable unsaturated bond is contained in the resin particles and an ester compound having a glycerol skeleton is used as the release agent, the resulting electrostatic image development toner can have excellent low-temperature fixing properties, storage stability, and hot offset resistance and enables suppression of generation of ultrafine particles (UFPs), and thus has completed the present invention.

Namely, the present invention provides an electrostatic image development toner comprising colored resin particles and an external additive, the colored resin particles containing a binder resin, a colorant, an aromatic vinyl thermoplastic elastomer having a polymerizable unsaturated bond, and a release agent, wherein the release agent is an ester compound having a glycerol skeleton.

In the electrostatic image development toner according to the present invention, the ester compound having a glycerol skeleton preferably has an ester structure formed from glycerol and a monocarboxylic acid having 16 or more carbon atoms.

In the electrostatic image development toner according to the present invention, the content of the aromatic vinyl thermoplastic elastomer is preferably 1 to 10 parts by mass relative to 100 parts by mass of the binder resin.

In the electrostatic image development toner according to the present invention, the content of the release agent is preferably 1 to 30 parts by mass relative to 100 parts by mass of the binder resin.

In the electrostatic image development toner according to the present invention, the aromatic vinyl thermoplastic elastomer is preferably a block copolymer containing at least one aromatic vinyl polymer block and at least one conjugated diene polymer block.

In the electrostatic image development toner according to the present invention, the aromatic vinyl thermoplastic elastomer is preferably a composition comprising an aromatic vinyl-conjugated diene block copolymer and an aromatic vinyl-conjugated diene-aromatic vinyl block copolymer.

Effects of Invention

The present invention can provide an electrostatic image development toner having excellent low-temperature fixing properties, high storage stability, and high hot offset resistance and ensuring suppression of generation of ultrafine particles (UFPs).

DESCRIPTION OF EMBODIMENTS

Figure 1A:
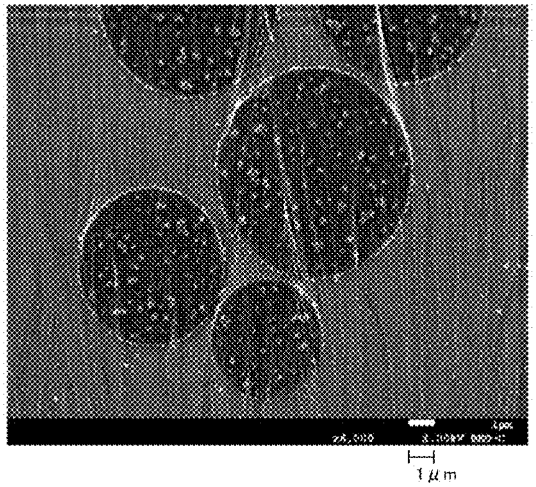
FIG. 1(A) shows an SEM photograph (secondary electron image) of cross-sections of colored resin particles in Example 1.

The electrostatic image development toner according to the present invention (hereinafter, simply referred to as "toner" in some cases) comprises colored resin particles and an external additive, the colored resin particles containing a binder resin, a colorant, an aromatic vinyl thermoplastic elastomer having a polymerizable unsaturated bond, and a release agent, wherein the release agent to be used is an ester compound having a glycerol skeleton.

First, a process of producing colored resin particles forming the toner according to the present invention will be described.

The process of producing colored resin particles forming the toner according to the present invention is mainly classified into dry processes such as a pulverization process and wet processes such as emulsion polymerization aggregation, dispersion polymerization, suspension polymerization, and dissolution suspension processes. Preferred are wet processes, which facilitate preparation of toners having high printing properties such as image reproductivity. Among these wet processes, preferred are polymerization processes such as emulsion polymerization aggregation, dispersion polymerization, and suspension polymerization because these facilitate preparation of toners having a particle size in micrometers and a relatively small particle size distribution. Among these, more preferred is suspension polymerization.

The emulsion polymerization aggregation process is a process of producing colored resin particles by polymerizing a polymerizable monomer in an emulsion to prepare resin fine particles, and aggregating the resin fine particles with a colorant and the like. The dissolution suspension process is a process of producing colored resin particles by forming droplets through addition of a solution or dispersion of toner components such as a binder resin and a colorant in an organic solvent to an aqueous medium, and then removing the organic solvent. In these processes, known techniques can be used.

The colored resin particles forming the toner according to the present invention can be produced by any of the wet processes and the dry processes. If (A) a suspension polymerization process as a preferred wet process or (B) a pulverization process as a representative dry process is used to produce the colored resin particles, the production is performed by the following process. First, (A) the suspension polymerization process will be described.

(A) Suspension Polymerization Process (A-1) Step of Preparing Polymerizable Monomer Composition In the suspension polymerization process, first, a polymerizable monomer, a colorant, an aromatic vinyl thermoplastic elastomer having a polymerizable unsaturated bond, a release agent, and other additives optionally used, such as a charge control agent, are mixed and dissolved to prepare a polymerizable monomer composition. During the preparation of the polymerizable monomer composition, these materials are mixed using a medium type dispersing machine, for example.

In the present invention, the polymerizable monomer indicates a polymerizable compound. The polymerizable monomer is converted into a binder resin as a result of polymerization of the polymerizable monomer. In the polymerizable monomer, preferred is use of a monovinyl monomer as the main component forming the polymerizable monomer. Examples of the monovinyl monomer include styrene-based monomers such as styrene, vinyltoluene, α-methylstyrene, and ethylstyrene; (meth)acrylate monomers such as methyl acrylate, ethyl acrylate, propyl acrylate, butyl acrylate, 2-ethylhexyl acrylate, dimethylaminoethyl acrylate, methyl methacrylate, ethyl methacrylate, propyl methacrylate, butyl methacrylate, 2-ethylhexyl methacrylate, and dimethylaminoethyl methacrylate; acrylic acid and methacrylic acid; nitrile compounds such as acrylonitrile and methacrylonitrile; amide compounds such as acrylamide and methacrylamide; olefins such as ethylene, propylene, and butylene; and the like. These monovinyl monomers can be used alone or in combination. Among these, preferred are styrene-based monomers and (meth)acrylate monomers, and more preferred are styrene and butyl acrylate. Moreover, preferred is use of at least a styrene-based monomer and an (meth)acrylate monomer as the monovinyl monomers because they can further enhance the low-temperature fixing properties of the resulting toner.

The proportion of styrene-based monomer units contained in the binder resin used in the present invention is preferably 60% by mass or more, more preferably 65% by mass or more, still more preferably 68% by mass or more, further still more preferably 70% by mass or more, particularly preferably 74% by mass or more. The upper limit thereof is preferably 85% by mass or less, more preferably 80% by mass or less, still more preferably 77% by mass or less. The proportion of (meth)acrylate monomer units is preferably 20% by mass or more, more preferably 21% by mass or more, still more preferably 21.5% by mass or more, particularly preferably 22% by mass or more. The upper limit thereof is preferably 40% by mass or less, more preferably 30% by mass or less, still more preferably 28% by mass or less, particularly preferably 26% by mass or less. By controlling the proportion of styrene-based monomer units and that of (meth)acrylate monomer units within the above ranges, the resulting toner can have high storage stability and further enhanced low-temperature fixing properties.

In the present invention, to improve hot offset and storage properties, any cross-linkable polymerizable monomer is preferably used in combination with the monovinyl monomer. The cross-linkable polymerizable monomer indicates a monomer having two or more polymerizable functional groups. Examples of the cross-linkable polymerizable monomer include aromatic divinyl compounds such as divinylbenzene, divinylnaphthalene, and derivatives thereof; ester compounds formed of two or more carboxylic acids esterified to an alcohol having 2 or more hydroxyl groups, such as ethylene glycol dimethacrylate and diethylene glycol dimethacrylate; other divinyl compounds such as N,N-divinylaniline and divinyl ether; compounds having 3 or more vinyl groups; and the like. These cross-linkable polymerizable monomers can be used alone or in combination. The cross-linkable polymerizable monomer is used in an amount of preferably 0.1 to 5 parts by mass, more preferably 0.15 to 2 parts by mass, still more preferably 0.2 to 0.7 parts by mass relative to 100 parts by mass of the monovinyl monomer. The proportion of cross-linkable polymerizable monomer units in the binder resin used in the present invention is preferably 0.1 to 5% by mass, more preferably 0.15 to 2% by mass, still more preferably 0.2 to 0.7% by mass. Control of the amount and proportion of the cross-linkable polymerizable monomer within the above ranges can further enhance the storage stability and low-temperature fixing properties of the resulting toner.

Any macromonomer is preferably used as part of the polymerizable monomer because use of such a macromonomer can further enhance the storage properties and low-temperature fixing properties of the resulting toner. The macromonomer refers to a reactive oligomer or polymer having a terminal polymerizable carbon-carbon unsaturated bond and a number average molecular weight (Mn) of usually 1,000 to 30,000. Preferred macromonomers are those which provide a polymer having a glass transition temperature (Tg) higher than that of the polymer obtained without polymerization of the macromonomer. The macromonomer is used in an amount of preferably 0.03 to 5 parts by mass, more preferably 0.05 to 1 part by mass relative to 100 parts by mass of the monovinyl monomer.

Colorants are used in the present invention. If color toners (usually, four toners of black, cyan, yellow, and magenta toners are used) are produced, a black colorant, a cyan colorant, a yellow colorant, and a magenta colorant can be used for the respective color toners.

Examples of the black colorant to be used include pigments and dyes such as carbon black, titanium black, magnetic powders of zinc iron oxide and nickel iron oxide, and the like.

Examples of the cyan colorant to be used include compounds such as copper phthalocyanine pigments and derivatives thereof, and anthraquinone pigments and dyes. Specifically, examples thereof include C.I. Pigment Blues 2, 3, 6, 15, 15:1, 15:2, 15:3, 15:4, 16, 17:1, 60, and the like.

Examples of the yellow colorant to be used include compounds such as azo pigments such as monoazo pigments and disazo pigments, and fused polycyclic pigments and dyes. Specifically, examples thereof include C.I. Pigment Yellows 3, 12, 13, 14, 15, 17, 62, 65, 73, 74, 83, 93, 97, 120, 138, 151, 155, 180, 181, 185, 186, 214, and 219, and C.I. Solvent Yellows 98 and 162, and the like.

Examples of the magenta colorant to be used include compounds such as azo pigments such as monoazo pigments and disazo pigments, and fused polycyclic pigments and dyes. Specifically, examples thereof include C.I. Pigment Reds 31, 48, 57:1, 58, 60, 63, 64, 68, 81, 83, 87, 88, 89, 90, 112, 114, 122, 123, 144, 146, 149, 150, 163, 170, 184, 185, 187, 202, 206, 207, 209, and 251, C.I. Solvent Violets 31, 47, and 59, C.I. Pigment Violet 19, and the like.

In the present invention, for the respective colors, these colorants may be used alone or in combination, and the amount of the colorant(s) to be used is preferably 1 to 10 parts by mass relative to 100 parts by mass of the binder resin (100 parts by mass of the polymerizable monomer to prepare the binder resin).

In the present invention, the colored resin particles contain an aromatic vinyl thermoplastic elastomer having a polymerizable unsaturated bond. In the present invention, the release agent to be used is an ester compound having a glycerol skeleton as described later. In other words, in the present invention, the aromatic vinyl thermoplastic elastomer having a polymerizable unsaturated bond is used in combination with the ester compound having a glycerol skeleton as the release agent, thereby providing advantageous effects described below.

Namely, if the aromatic vinyl thermoplastic elastomer having a polymerizable unsaturated bond is contained, the polymerizable unsaturated bond reacts with the binder resin to fix the aromatic vinyl thermoplastic elastomer to the binder resin. The aromatic vinyl thermoplastic elastomer in such a fixed state interacts with the ester compound having a glycerol skeleton as the release agent. As a result of such interaction, the ester compound having a glycerol skeleton as the release agent can be homogeneously finely dispersed (homogeneously dispersed in the form of fine particles) in the binder resin forming the colored resin particles, thereby enabling effective suppression in blocking of the resulting toner and ensuring a sufficient effect of improving low-temperature fixing properties, which is obtained by adding the ester compound having a glycerol skeleton as the release agent. This results in a toner having high storage stability and excellent low-temperature fixing properties. In addition, according to the present invention, owing to the effect of the ester compound having a glycerol skeleton provided by use of the ester compound having a glycerol skeleton as the release agent, a toner having high storage stability, excellent low-temperature fixing properties, and excellent hot offset resistance, and enabling effective suppression of generation of ultrafine particles (UFPs) can be provided.

In the present invention, the term "aromatic vinyl thermoplastic elastomer" indicates a random, block, or graft copolymer of an aromatic vinyl monomer and another monomer copolymerizable with the aromatic vinyl monomer and a hydrogenated product of such a copolymer. The tau "polymerizable unsaturated bond" indicates an unsaturated bond having polymerization activity, and suitable examples thereof include olefinic carbon-carbon double bonds having polymerization activity. The olefinic carbon-carbon double bonds having polymerization activity can be introduced into the aromatic vinyl thermoplastic elastomer by any method, and examples thereof include a method using a conjugated diene monomer as another monomer copolymerizable with the aromatic vinyl monomer.

Although not particularly limited, the aromatic vinyl thermoplastic elastomer having a polymerizable unsaturated bond used in the present invention is preferably a block copolymer containing at least one aromatic vinyl polymer block and at least one conjugated diene polymer block to further enhance the storage stability and low-temperature fixing properties of the toner.

Hereinafter, as a typical example of the aromatic vinyl thermoplastic elastomer having a polymerizable unsaturated bond, a block copolymer containing at least one aromatic vinyl polymer block and at least one conjugated diene polymer block (hereinafter, simply referred to as "block copolymer" in some cases) will be described. The block copolymer used in the present invention contains at least one aromatic vinyl polymer block prepared by polymerization of an aromatic vinyl monomer and at least one conjugated diene polymer block prepared by polymerization of a conjugated diene monomer.

The aromatic vinyl monomer can be any aromatic vinyl compound, and examples thereof include styrene, α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, 5-t-butyl-2-methylstyrene, 2-chlorostyrene, 3-chlorostyrene, 4-chlorostyrene, 4-bromostyrene, 2-methyl-4,6-dichlorostyrene, 2,4-dibromostyrene, vinylnaphthalene, and the like. Among these, preferred is use of styrene. For each aromatic vinyl polymer block, these aromatic vinyl monomers may be used alone or in combination. If the block copolymer has a plurality of aromatic vinyl polymer blocks, the aromatic vinyl polymer blocks may be formed of the same aromatic vinyl monomer units, or may be formed of different aromatic vinyl monomer units.

The aromatic vinyl polymer block may contain monomer units other than the aromatic vinyl monomer units as long as the aromatic vinyl monomer units are the main repeating units. Examples of the other monomers to be used in the aromatic vinyl polymer block include conjugated diene monomers such as 1,3-butadiene and isoprene (2-methyl-1,3-butadiene), α,β-unsaturated nitrile monomers, unsaturated carboxylic acid monomers or acid anhydride monomers thereof, unsaturated carboxylic acid ester monomers, non-conjugated diene monomers, and the like. The content of the monomer units other than the aromatic vinyl monomer units in the aromatic vinyl polymer block is preferably 20% by mass or less, more preferably 10% by mass or less, particularly preferably substantially 0% by mass.

The conjugated diene monomer can be any conjugated diene compound, and examples thereof include 1,3-butadiene, isoprene, 2,3-dimethyl-1,3-butadiene, 2-chloro-1,3-butadiene, 1,3-pentadiene, 1,3-hexadiene, and the like. Among these, use of 1,3-butadiene and/or isoprene is preferred and use of isoprene is particularly preferred from the viewpoint of a high effect of improving storage stability and low-temperature fixing properties caused by introduction of the polymerizable unsaturated bond. For each of the conjugated diene polymer blocks, these conjugated diene monomers can be used alone or in combination. If the block copolymer has a plurality of conjugated diene polymer blocks, the conjugated diene polymer blocks may be formed of the same conjugated diene monomer units, or may be formed of different conjugated diene monomer units. Furthermore, the unsaturated bonds of the conjugated diene polymer blocks may be partially hydrogenated.

The conjugated diene polymer block may contain monomer units other than the conjugated diene monomer units as long as the conjugated diene monomer units are the main repeating units. Examples of the other monomers to be used in the conjugated diene polymer block include aromatic vinyl monomers such as styrene and α-methylstyrene, α,β-unsaturated nitrile monomers, unsaturated carboxylic acid monomers, unsaturated carboxylic acid anhydride monomers, unsaturated carboxylic acid ester monomers, non-conjugated diene monomers, and the like. The content of the monomer units other than the conjugated diene monomer units in the conjugated diene polymer block is preferably 20% by mass or less, more preferably 10% by mass or less, particularly preferably substantially 0% by mass.

Although not particularly limited, the vinyl bond content of the conjugated diene polymer block (the proportion of 1,2-vinyl bond units and 3,4-vinyl bond units in the total conjugated diene monomer units of the conjugated diene polymer block) is preferably 1 to 20 mol %, more preferably 2 to 15 mol %, particularly preferably 3 to 10 mol %.

The number of polymer blocks and the binding pattern of the blocks are not particularly limited as long as the block copolymer contains at least one aromatic vinyl polymer block and at least one conjugated diene polymer block. Specific examples of the block copolymer used in the present invention include the followings. In the specific examples below, Ar represents an aromatic vinyl polymer block, D represents a conjugated diene polymer block, X represents a residue of a coupling agent, and n represents an integer of 2 or more.

(a) An aromatic vinyl-conjugated diene block copolymer represented by Ar-D
(b) An aromatic vinyl-conjugated diene-aromatic vinyl block copolymer represented by Ar-D-Ar and/or (Ar-D)n-X
(c) A conjugated diene-aromatic vinyl-conjugated diene block copolymer represented by D-Ar-D and/or (D-Ar)n-X
(d) An aromatic vinyl-conjugated diene-aromatic vinyl-conjugated diene block copolymer represented by Ar-D-Ar-D
(e) A block copolymer composition comprising any combination of two or more of the block copolymers (a) to (d)

In the present invention, preferred is use of a block copolymer containing at least an aromatic vinyl-conjugated diene block copolymer represented by (a) Ar-D, and more preferred is use of a block copolymer containing at least an aromatic vinyl-conjugated diene block copolymer represented by (a) Ar-D and an aromatic vinyl-conjugated diene-aromatic vinyl block copolymer represented by (b) Ar-D-Ar and/or (Ar-D)n-X.

Although not particularly limited, the weight average molecular weight (Mw(Ar)) of the aromatic vinyl polymer block Ar in the aromatic vinyl-conjugated diene block copolymer represented by Ar-D is preferably 10000 to 50000, more preferably 15000 to 30000, and the weight average molecular weight (Mw(D)) of the conjugated diene polymer block D therein is preferably 50000 to 200000, more preferably 60000 to 150000.

Although not particularly limited, the weight average molecular weight (Mw(Ar)) of the aromatic vinyl polymer block Ar in the aromatic vinyl-conjugated diene-aromatic vinyl block copolymer represented by Ar-D-Ar and/or (Ar-D)n-X is preferably 15000 to 70000, more preferably 16000 to 50000, and the weight average molecular weight (Mw(D)) of the conjugated diene polymer block D therein is preferably 100000 to 300000, more preferably 120000 to 250000.

The weight average molecular weights above are values against polystyrene standards obtained in measurement by gel permeation chromatography (GPC) using tetrahydrofuran.

The proportion of aromatic vinyl monomer units in the total monomer units in the block copolymer used in the present invention is preferably 10 to 30% by mass, more preferably 12 to 25% by mass, still more preferably 15% by mass or more and less than 25% by mass. By controlling the proportion of the aromatic vinyl monomer units within the range above, the compatibility of the block copolymer with the release agent and the compatibility of the block copolymer with the binder resin can be highly balanced, thus providing a toner having higher storage stability and more excellent low-temperature fixing properties.

If all the polymer components forming the block copolymer are formed of only aromatic vinyl monomer units and conjugated diene monomer units, conjugated diene monomer units are decomposed by subjecting the block copolymer to ozone decomposition, and then reduction with lithium aluminum hydride by the method described in Rubber Chem. Technol., 45, 1295 (1972), and only aromatic vinyl monomer units can be extracted. Thus, the content of the aromatic vinyl monomer units in the entire block copolymer can be readily measured.

Although not particularly limited, the weight average molecular weight (Mw) of the aromatic vinyl monomer units in the block copolymer is preferably 10000 to 50000, more preferably 15000 to 40000 as a value against polystyrene standards obtained in measurement by gel permeation chromatography (GPC) using tetrahydrofuran. Although not particularly limited, the weight average molecular weight (Mw) of the conjugated diene monomer units in the block copolymer is preferably 50000 to 200000, more preferably 60000 to 180000.

Although not particularly limited, the melt index (MI) of the block copolymer specified by ASTM D-1238 (G condition, 200° C., 5 kg) is selected from the range of 1 to 1000 g/10 min, preferably 5 to 30 g/10 min.

The block copolymer used in the present invention can be prepared by a normal method. Examples of the method of preparing the block copolymer include a method of successively polymerizing the aromatic vinyl monomer and the conjugated diene monomer by anionic living polymerization to form polymer blocks, and optionally coupling the polymer blocks with a coupling agent.

If the block copolymer used in the present invention is a block copolymer containing at least an aromatic vinyl-conjugated diene block copolymer represented by (a) Ar-D and an aromatic vinyl-conjugated diene-aromatic vinyl block copolymer represented by (b) Ar-D-Ar and/or (Ar-D) n-X, the following method can be used.

Examples thereof include the following method: first, by anionic living polymerization, the aromatic vinyl monomer is polymerized, and then the conjugated diene monomer is added and polymerized. Thereby, a terminally active diblock copolymer is prepared. In the next step, less than 1 molar equivalent of a coupling agent is added relative to the active terminal of the terminally active diblock copolymer to couple a portion of the terminally active diblock copolymer, thereby giving an aromatic vinyl-conjugated diene-aromatic vinyl block copolymer represented by (Ar-D)n-X. Thereafter, a polymerization terminator is added to inactivate the residual portion of the terminally active diblock copolymer, thereby giving a diblock copolymer represented by Ar-D. The aromatic vinyl-conjugated diene-aromatic vinyl block copolymer represented by Ar-D-Ar (where D contains a residue of the coupling agent) can be prepared by using a bifunctional coupling agent such as dichlorosilane, monomethyldichlorosilane, dimethyldichlorosilane, diphenyldimethoxysilane, diphenyldiethoxysilane, dichloroethane, dibromoethane, methylene chloride, or dibromomethane as the coupling agent in this method.

In the present invention, although the aromatic vinyl-conjugated diene block copolymer represented by (a) Ar-D and the aromatic vinyl-conjugated diene-aromatic vinyl block copolymer represented by (b) Ar-D-Ar and/or (Ar-D) n-X can be contained in any proportions, the aromatic vinyl-conjugated diene block copolymer represented by (a) Ar-D is contained in a proportion of preferably 10 to 90% by mass, more preferably 20 to 80% by mass. The aromatic vinyl-conjugated diene-aromatic vinyl block copolymer represented by (b) Ar-D-Ar and/or (Ar-D)n-X is contained in a proportion of preferably 10 to 90% by mass, more preferably 20 to 80% by mass.

Although not particularly limited, the weight average molecular weight (Mw) of the aromatic vinyl thermoplastic elastomer having a polymerizable unsaturated bond used in the present invention is preferably 60,000 to 350,000, more preferably 80,000 to 250,000 as a value against polystyrene standards obtained in measurement by gel permeation chromatography (GPC) using tetrahydrofuran. Control of the weight average molecular weight (Mw) in this range results in a toner having further enhanced storage stability and low-temperature fixing properties.

The content of the aromatic vinyl thermoplastic elastomer having a polymerizable unsaturated bond is preferably 1 to 10 parts by mass, more preferably 1.5 to 8 parts by mass, still more preferably 2 to 5 parts by mass relative to 100 parts by mass of the binder resin (100 parts by mass of the polymerizable monomer to prepare the binder resin). Control of the content of the aromatic vinyl thermoplastic elastomer having a polymerizable unsaturated bond within this range can further enhance the effect of addition thereof, that is, the effect of improving the storage stability and low-temperature fixing properties of the resulting toner.

In the present invention, the ester compound having a glycerol skeleton is contained as the release agent. Due to the interaction with the aromatic vinyl thermoplastic elastomer described above caused by use of the ester compound having a glycerol skeleton as the release agent, the storage stability and low-temperature fixing properties of the resulting toner can be enhanced, the hot offset resistance can be improved, and generation of ultrafine particles (UFPs) can be effectively suppressed. In particular, in the present invention, due to the above-described interaction with the aromatic vinyl thermoplastic elastomer caused by use of the ester compound having a glycerol skeleton as the release agent, the ester compound having a glycerol skeleton as the release agent can be homogeneously finely dispersed (homogeneously dispersed in the form of fine particles) in the binder resin forming the colored resin particles. This ensures a toner having high storage stability and excellent low-temperature fixing properties, having high hot offset resistance, and enabling effective suppression of generation of ultrafine particles (UFPs).

The ester compound having a glycerol skeleton used in the present invention is not particularly limited, and may be any ester compound having a glycerol skeleton, more specifically, any ester compound having at least one ester structure formed from glycerol and a carboxylic acid. Any one of monoesters, diesters, and triesters of glycerol can be used. Preferred are triesters of glycerol because these can demonstrate a higher effect of addition thereof.

Examples of the carboxylic acid which forms an ester bond with glycerol to form an ester structure include, but should not be limited to, polyvalent carboxylic acids such as monocarboxylic acids and dicarboxylic acids, monoesters of polyvalent carboxylic acids, such as dicarboxylic acid monoesters, and the like. Preferred are monocarboxylic acids having 16 or more carbon atoms, and more preferred are monocarboxylic acids having 16 to 30 carbon atoms.

Although the monocarboxylic acids having 16 or more carbon atoms are not particularly limited, saturated fatty acids and/or unsaturated fatty acids having 16 or more carbon atoms are suitable.

Examples of the saturated fatty acids having 16 or more carbon atoms include palmitic acid ($C_{16}$), margaric acid ($C_{17}$), stearic acid ($C_{18}$), arachidic acid ($C_{20}$), behenic acid ($C_{22}$), lignoceric acid ($C_{24}$), cerotic acid ($C_{26}$), montanic acid ($C_{28}$), melissic acid ($C_{30}$), and the like. Among these saturated fatty acids, preferred are palmitic acid ($C_{16}$), stearic acid ($C_{18}$), and behenic acid ($C_{22}$), and more preferred is stearic acid ($C_{18}$).

Specific examples of unsaturated fatty acids having 16 or more carbon atoms include, but should not be limited to, the following compounds:

palmitoleic acid ($CH_3(CH_2)_5CH{=}CH(CH_2)_7COOH$)
oleic acid ($CH_3(CH_2)_7CH{=}CH(CH_2)_7COOH$)
vaccenic acid ($CH_3(CH_2)_5CH{=}CH(CH_2)_9CCOH$)
linoleic acid ($CH_3(CH_2)_3(CH_2CH{=}CH)_2(CH_2)_7COOH$)
(9,12,15)-linolenic acid ($CH_3(CH_2CH{=}CH)_3(CH_2)_7COOH$)
(6,9,12)-linolenic acid ($CH_3(CH_2)_3(CH_2CH{=}CH)_3(CH_2)_4COOH$)
eleostearic acid ($CH_3(CH_2)_3(CH{=}CH)_3(CH_2)_7COOH$)
arachadonic acid ($CH_3(CH_2)_3(CH_2CH{=}CH)_4(CH_2)_3COOH$)

The ester compound having a glycerol skeleton used in the present invention can be prepared by a normal method. Examples of the method of preparing the ester compound having a glycerol skeleton include a method of causing an ester reaction using glycerol and a carboxylic acid. In this case, as the carboxylic acid, two or more carboxylic acids may be used in combination to form a compound in which the two or more carboxylic acids are esterified to glycerol.

Specific examples of the ester compound having a glycerol skeleton include palmitic acid triglyceride, margaric acid triglyceride, stearic acid triglyceride, arachidic acid triglyceride, behenic acid triglyceride, lignoceric acid triglyceride, cerotic acid triglyceride, montanic acid triglyceride, melissic acid triglyceride, palmitoleic acid triglyceride, oleic acid triglyceride, vaccenic acid triglyceride, linoleic acid triglyceride, (9,12,15)-linolenic acid triglyceride, (6,9,12)-linolenic acid triglyceride, eleostearic acid triglyceride, arachadonic acid triglyceride, and the like. These ester compounds having a glycerol skeleton may be used alone or in combination. Among these, preferred are palmitic acid triglyceride, stearic acid triglyceride, and behenic acid triglyceride, and more preferred is behenic acid triglyceride.

To further enhance the low-temperature fixing properties of the resulting toner, the ester compound having a glycerol skeleton used in the present invention has a number average molecular weight (Mn) of preferably 500 to 1500, more preferably 550 to 1200, still more preferably 550 to 1100. The number average molecular weight (Mn) of the ester compound having a glycerol skeleton can be measured as a value against polystyrene standards obtained in measurement by gel permeation chromatography (GPC) using tetrahydrofuran.

The content of the ester compound having a glycerol skeleton as the release agent is preferably 1 to 30 parts by mass, more preferably 8 to 28 parts by mass, still more preferably 12 to 25 parts by mass, particularly preferably 17 to 23 parts by mass relative to 100 parts by mass of the binder resin (100 parts by mass of the polymerizable monomer to prepare the binder resin). By controlling the content of the ester compound having a glycerol skeleton as the release agent within this range, a toner having a relatively uniform particle size distribution and further enhanced low-temperature fixing properties can be ensured.

In the present invention, a release agent other than the ester compound having a glycerol skeleton may be used as a release agent in combination with the above-described ester compound having a glycerol skeleton. Examples thereof include low molecular weight polyolefin waxes and modified waxes thereof; plant-derived natural waxes such as jojoba; petroleum waxes such as paraffin; mineral waxes such as ozokerite; synthetic waxes such as Fischer-Tropsch wax; polyhydric alcohol esters such as dipentaerythritol esters; and the like. These may be used alone or in combination.

In the present invention, an acrylic resin can be used as another additive to further suppress bleed out of the release agent.

The acrylic resin is a copolymer (acrylate copolymer) mainly containing at least one of an acrylate ester and a methacrylate ester and at least one of acrylic acid and methacrylic acid. A preferred acid monomer is acrylic acid.

Examples of the acrylic resin include copolymers of an acrylate ester and acrylic acid, those of an acrylate ester and methacrylic acid, those of a methacrylate ester and acrylic acid, copolymers of a methacrylate ester and methacrylic acid, those of an acrylate ester, a methacrylate ester, and acrylic acid, those of an acrylate ester, a methacrylate ester, and methacrylic acid, and those of an acrylate ester, a methacrylate ester, acrylic acid, and methacrylic acid. Among these, preferred is used a copolymer of an acrylate ester, a methacrylate ester, and acrylic acid.

The acrylic resin has an acid value of usually 0.5 to 7 mgKOH/g, preferably 1 to 6 mgKOH/g, more preferably 1.5 to 4 mgKOH/g. Control of the acid value of the acrylic resin within this range enables favorable preparation of desired colored resin particles while ensuring favorable heat-resistant storage properties, favorable low-temperature fixing properties, and favorable print durability under low temperature/low humidity environments and high temperature/high humidity environments.

The acid value of the acrylic resin is a value measured according to JIS K 0070, which is a standard oil and fat analysis method specified by JAPAN Industrial Standards Committee (JICS).

The acrylic resin has a weight average molecular weight (Mw) of usually 6,000 to 50,000, preferably 8,000 to 25,000, more preferably 10,000 to 20,000.

Control of the weight average molecular weight (Mw) of the acrylic resin within this range can ensure favorable heat-resistant storage properties, favorable durability, and favorable low-temperature fixing properties.

The acrylic resin has a glass transition temperature Tg of usually 60 to 85° C., preferably 65 to 80° C., more preferably 70 to 77° C. Control of the glass transition temperature within this range can ensure favorable heat-resistant storage properties and favorable low-temperature fixing properties.

The glass transition temperature Tg of the acrylic resin can be determined according to ASTM D3418-82, for example.

The ratio of acrylate ester monomer units, methacrylate ester monomer units, acrylic acid monomer units, and methacrylic acid monomer units in the acrylic resin is not particularly limited as long as the acrylic resin satisfies the acid value, weight average molecular weight MW, and glass transition temperature requirements specified above.

The ratio of these four monomer units above can be adjusted by the mass ratio of the amounts of the acrylate ester, the methacrylate ester, acrylic acid, and methacrylic acid to be added for synthesis of the copolymer. The mass ratio of the amounts thereof to be added may be (acrylate ester and/or methacrylate ester):(acrylic acid and/or methacrylic acid)=(99 to 99.95):(0.05 to 1), for example, and is preferably (acrylate ester and/or methacrylate ester):(acrylic acid and/or methacrylic acid)=(99.4 to 99.9):(0.1 to 0.6), more preferably (acrylate ester and/or methacrylate ester):

(acrylic acid and/or methacrylic acid)=(99.5 to 99.7):(0.3 to 0.5). Among these polymerizable monomers, the acrylate ester and/or the methacrylate ester may be replaced by a different monomer, such as any of the styrene derivatives, the nitrile compounds, and the amide compounds listed for the monovinyl monomer forming the binder resin above, in the range not impairing the effects of the present invention. The proportion thereof is 10% by mass or less, preferably 2% by mass or less of the total amount of the acrylate ester and/or the methacrylate ester to be added. Preferably, the acrylate ester and/or the methacrylate ester is not replaced.

Examples of the acrylate ester used in the acrylic resin include methyl acrylate, ethyl acrylate, n-propyl acrylate, isopropyl acrylate, n-butyl acrylate, isobutyl acrylate, sec-butyl acrylate, tert-butyl acrylate, n-pentyl acrylate, sec-pentyl acrylate, isopentyl acrylate, neopentyl acrylate, n-hexyl acrylate, isohexyl acrylate, neohexyl acrylate, sec-hexyl acrylate, tert-hexyl acrylate, and the like. Among these, preferred are ethyl acrylate, n-propyl acrylate, isopropyl acrylate, and n-butyl acrylate, and more preferred is n-butyl acrylate.

Examples of the methacrylate ester used in the acrylic resin include methyl methacrylate, ethyl methacrylate, n-propyl methacrylate, isopropyl methacrylate, n-butyl methacrylate, isobutyl methacrylate, sec-butyl methacrylate, tert-butyl methacrylate, n-pentyl methacrylate, sec-pentyl methacrylate, isopentyl methacrylate, neopentyl methacrylate, n-hexyl methacrylate, isohexyl methacrylate, neohexyl methacrylate, sec-hexyl methacrylate, tert-hexyl methacrylate, and the like. Among these, preferred are methyl methacrylate, n-propyl methacrylate, isopropyl methacrylate, and n-butyl methacrylate, and more preferred is methyl methacrylate.

The amount of the acrylic resin to be added is preferably 0.3 to 4 parts by mass, more preferably 0.5 to 3.0 parts by mass, still more preferably 0.7 to 2.0 parts by mass relative to 100 parts by mass of the binder resin (100 parts by mass of the polymerizable monomer to prepare the binder resin). Control of the amount of the acrylic resin to be added within this range can ensure favorable environmental stability and a sufficient effect of addition.

Although the acrylic resin to be used can be a commercially available product, the acrylic resin can be prepared by a known process such as solution polymerization, aqueous solution polymerization, ion polymerization, high temperature and pressure polymerization, or suspension polymerization.

In the present invention, to improve the charging properties of the toner, a charge control agent having positive or negative chargeability can be used as another additive.

The charge control agent can be any charge control agent usually used for the toner. Among these charge control agents, charge control resins having positive or negative chargeability are preferred because these have high compatibility with the polymerizable monomer and can impart stable charging properties (charging stability) to the toner particles to improve the dispersibility of the colorant, and use of a charge control resin having negative chargeability is preferred to prepare a negatively chargeable toner.

Examples of the charge control agents having positive chargeability include nigrosine dyes, quaternary ammonium salts, triaminotriphenylmethane compounds, and imidazole compounds; polyamine resins, quaternary ammonium group-containing copolymers, and copolymers containing a quaternary ammonium salt group as charge control resins preferably used; and the like.

Examples of the charge control agents having negative chargeability include azo dyes containing a metal such as Cr, Co, Al, or Fe, salicylic acid metal compounds, and alkyl salicylic acid metal compounds; sulfonate group-containing copolymers, sulfonate group-containing copolymers, carboxylic acid group-containing copolymers, and copolymers containing a carboxylic acid salt group as the charge control resins preferably used; and the like.

The weight average molecular weight (Mw) of the charge control resin is a value against polystyrene standards obtained in measurement by gel permeation chromatography (GPC) using tetrahydrofuran, and is within the range of 5,000 to 30,000, preferably 8,000 to 25,000, more preferably 10,000 to 20,000.

The copolymerization proportion of the monomer having a functional group such as a quaternary ammonium group or a sulfonate group in the charge control resin is within the range of preferably 0.5 to 12% by mass, more preferably 1.0 to 6% by mass, still more preferably 1.5 to 3% by mass.

The content of the charge control agent is preferably 0.01 to 10 parts by mass, more preferably 0.03 to 8 parts by mass relative to 100 parts by mass of the binder resin (100 parts by mass of the polymerizable monomer to prepare the binder resin). By controlling the amount of the charge control agent to be added within this range, generation of fogging and print dirt can be effectively suppressed, and the dispersibility of the colorant can be appropriately enhanced.

Furthermore, a molecular weight modifier may be used as another additive. The molecular weight modifier to be used can be any molecular weight modifier usually used for toners. Examples thereof include mercaptans such as t-dodecylmercaptan, n-dodecylmercaptan, n-octylmercaptan, and 2,2,4,6,6-pentamethylheptane-4-thiol; thiuram disulfides such as tetramethylthiuram disulfide, tetraethylthiuram disulfide, tetrabutylthiuram disulfide, N,N'-dimethyl-N,N'-diphenylthiuram disulfide, and N,N'-dioctadecyl-N,N'-diisopropylthiuram disulfide; and the like. These molecular weight modifiers may be used alone or in combination. The molecular weight modifier is used in an amount of preferably 0.01 to 10 parts by mass, more preferably 0.1 to 5 parts by mass relative to 100 parts by mass of the binder resin (100 parts by mass of the polymerizable monomer to prepare the binder resin).

(A-2) Suspension Step for Preparing Suspension (Droplet Forming Step)

In the next step, the polymerizable monomer composition prepared in the step (A-1) of preparing the polymerizable monomer composition, which comprises the polymerizable monomer, the colorant, the aromatic vinyl thermoplastic elastomer having a polymerizable unsaturated bond, and the ester compound having a glycerol skeleton as the release agent, is dispersed in an aqueous dispersive medium, and a polymerization initiator is added to form droplets of the polymerizable monomer composition. Here, suspension means formation of droplets of the polymerizable monomer composition in the aqueous dispersive medium. The dispersion treatment for forming droplets can be performed using an apparatus enabling strong stirring, such as an in-line type emulsion dispersing machine (available from Pacific Machinery & Engineering Co., Ltd., trade name: Milder) or a high-speed emulsion •dispersing machine (available from PRIMIX Corporation, trade name: T.K. Homomixer type MARK II).

Examples of the polymerization initiator include persulfuric acid salts such as potassium persulfate and ammonium persulfate; azo compounds such as 4,4'-azobis(4-cyanovaleric acid), 2,2'-azobis(2-methyl-N-(2-hydroxyethyl)propionamide), 2,2'-azobis(2-amidinopropane) dihydrochloride, 2,2'-azobis(2,4-dimethylvaleronitrile), and 2,2'-azobisisobutyronitrile; organic peroxides such as di-t-butyl peroxide, benzoyl peroxide, t-butyl peroxy-2-ethylhexanoate, t-hexyl peroxy-2-ethylbutanoate, diisopropyl peroxydicarbonate, di-t-butyl peroxyoxyisophthalate, and t-butyl peroxyisobutyrate; and the like. These can be used alone or in combination. Among these, preferred is use of an organic peroxide because it can reduce residual polymerizable monomer and ensure high print durability. Among these organic peroxides, peroxy esters are preferred, and non-aromatic peroxy esters, i.e., peroxy esters without having an aromatic ring are more preferred because these initiators have high efficiency and can reduce residual polymerizable monomer.

The polymerization initiator may be added after the polymerizable monomer composition is dispersed in the aqueous medium as described above and before droplets are formed, or may be added to the polymerizable monomer composition before the polymerizable monomer composition is dispersed in the aqueous medium (medium mainly containing water).

The polymerization initiator used for polymerization of the polymerizable monomer composition is added in an amount of preferably 0.1 to 20 parts by mass, more preferably 0.3 to 15 parts by mass, particularly preferably 1 to 10 parts by mass relative to 100 parts by mass of the binder resin (100 parts by mass of the polymerizable monomer to prepare the binder resin).

In the present invention, preferably, the aqueous medium contains a dispersion stabilizer. Examples of the dispersion stabilizer include inorganic compounds such as sulfates such as barium sulfate and calcium sulfate; carbonates such as barium carbonate, calcium carbonate, and magnesium carbonate; phosphates such as calcium phosphate; metal oxides such as aluminum oxide and titanium oxide; metal hydroxides such as aluminum hydroxide, magnesium hydroxide, and ferric hydroxide; and organic compounds such as water-soluble polymers such as poly(vinyl alcohol), methyl cellulose, and gelatin; anionic surfactants; nonionic surfactants; and amphoteric surfactants. These dispersion stabilizers can be used alone or in combination. The dispersion stabilizer is added in an amount of preferably 0.1 to 20 parts by mass, more preferably 0.2 to 10 parts by mass relative to 100 parts by mass of the binder resin (100 parts by mass of the polymerizable monomer to prepare the binder resin).

Among these dispersion stabilizers, preferred are inorganic compounds, and particularly preferred are colloids of poorly water-soluble metal hydroxides. Use of an inorganic compound, particularly a colloid of a poorly water-soluble metal hydroxide results in colored resin particles having a narrow particle size distribution, and can reduce the amount of residual dispersion stabilizer after washing, thus enabling reproduction of sharper images by the resulting toner without reducing the environmental stability.

(A-3) Polymerization Step

The desired suspension (aqueous dispersive medium containing droplets of the polymerizable monomer composition) prepared in the suspension step (A-2) for preparing a suspension (droplet forming step) is heated to initiate polymerization. Thereby, an aqueous dispersion of colored resin particles containing the binder resin, the colorant, the aromatic vinyl thermoplastic elastomer having a polymerizable unsaturated bond, and the ester compound having a glycerol skeleton as the release agent is prepared.

The polymerization temperature in the present invention is preferably 50° C. or more, more preferably 60 to 95° C. The polymerization time in the present invention is preferably 1 to 20 hours, more preferably 2 to 15 hours.

To keep droplets of the polymerizable monomer composition stably dispersed during polymerization, the polymerization may be allowed to progress while a dispersion treatment by stirring is being performed in the polymerization step subsequent to the suspension step (A-2) for preparing a suspension (droplet forming step).

In the present invention, the external additive may be added to the thus-prepared colored resin particles as they are, and the product may be used as a toner. Alternatively, so-called core-shell type (or also referred to as "capsule type") colored resin particles may be prepared, the colored resin particles comprising a core layer of the colored resin particles prepared through the polymerization step and a shell layer which is different from the core layer and disposed on the outer side thereof. In the core-shell type colored resin particles, a core layer made of a substance having a low softening point is coated with a substance having a softening point higher than that. Thereby, the storage stability and low-temperature fixing properties of the resulting toner can be further enhanced.

The core-shell type colored resin particles can be produced by any known traditional method without limitation. From the viewpoint of production efficiency, preferred is in situ polymerization or phase separation.

A method of producing the core-shell type colored resin particles by in situ polymerization will now be described.

In in situ polymerization, a polymerizable monomer for forming a shell layer (polymerizable monomer for a shell) and a polymerization initiator for a shell are added to the aqueous dispersive medium having colored resin particles dispersed therein, followed by polymerization. Thereby, the core-shell type colored resin particles can be prepared.

The polymerizable monomer for the shell to be used can be the same polymerizable monomer as described above. Among these, it is preferred that monomers (such as styrene and methyl methacrylate) which can provide a polymer having a Tg more than 80° C. be used alone or in combination.

Examples of the polymerization initiator for the shell used in polymerization of the polymerizable monomer for the shell include polymerization initiators such as metal salts of persulfuric acids such as potassium persulfate and ammonium persulfate; water-soluble azo compounds such as 2,2'-azobis(2-methyl-N-(2-hydroxyethyl)propionamide) and 2,2'-azobis-(2-methyl-N-(1,1-bis(hydroxymethyl)2-hydroxyethyl)propionamide); and the like. The polymerization initiator for the shell is used in an amount of preferably 0.1 to 30 parts by mass, more preferably 1 to 20 parts by mass relative to 100 parts by mass of the polymerizable monomer for the shell.

The polymerization temperature of the shell layer is preferably 50° C. or more, more preferably 60 to 95° C. The polymerization time of the shell layer is preferably 1 to 20 hours, more preferably 2 to 15 hours.

(A-4) Washing, Filtration, Dehydration, and Drying Steps

After the end of polymerization, it is preferred that the aqueous dispersion of the colored resin particles prepared through the polymerization step (A-3) be repeatedly, as needed, subjected to a series of operations of washing, filtration, dehydration, and drying according to a normal method.

First, to remove the residual dispersion stabilizer in the aqueous dispersion of the colored resin particles, preferably, an acid or alkali is added to the aqueous dispersion of the colored resin particles to wash the aqueous dispersion. If the dispersion stabilizer used is an inorganic compound soluble to acids, washing is preferably performed by adding an acid to the aqueous dispersion of the colored resin particles. If the dispersion stabilizer used is an inorganic compound soluble to alkalis, washing is preferably pertained by adding an alkali to the aqueous dispersion of the colored resin particles.

Moreover, if the inorganic compound soluble to acids is used as the dispersion stabilizer, it is preferred that the acid be added to the aqueous dispersion of the colored resin particles to adjust the pH to preferably 6.5 or less, more preferably 6 or less. The acid to be added can be inorganic acids such as sulfuric acid, hydrochloric acid, and nitric acid, and organic acids such as formic acid and acetic acid. Particularly suitable is sulfuric acid because of its great efficiency in removing the dispersion stabilizer and a small load on production facilities.

Dehydration and filtration can be performed by a variety of known methods, which are not particularly limited. Examples thereof include centrifugal filtration, vacuum filtration, pressurized filtration, and the like. The drying method is also not particularly limited, and a variety of methods can be used.

(B) Pulverization Process

If the pulverization process is used, the colored resin particles are produced by the following process.

First, the binder resin, the colorant, the aromatic vinyl thermoplastic elastomer having a polymerizable unsaturated bond, the ester compound having a glycerol skeleton as the release agent, and other additives optionally added, such as the charge control agent, are mixed with a mixer, such as a ball mill, a V-type mixer, a Henschel mixer (trade name), a high speed dissolver, an internal mixer, or a Forberg mixer. In the next step, the resulting mixture is kneaded under heating using a pressure kneader, a twin-screw extrusion kneader, a roller, or the like. The kneaded product is crushed using a mill such as a hammer mill, a cutter mill, a roller mill, or the like. Furthermore, the product is pulverized using a mill such as a jet mill or a high speed rotary mill, and is classified into a desired particle size with a classifier such as an air classifier or an air stream classifier. Thus, colored resin particles can be prepared by the pulverization process.

The binder resin, the colorant, the aromatic vinyl thermoplastic elastomer having a polymerizable unsaturated bond, the ester compound having a glycerol skeleton as the release agent, and other additives optionally added, such as the charge control agent, which are used in the pulverization process, can be the same as those listed in (A) Suspension polymerization process above. Moreover, the colored resin particles prepared by the pulverization process can be formed into the core-shell type colored resin particles by a method such as in situ polymerization as in the colored resin particles prepared by (A) Suspension polymerization process above.

The binder resin to be used may be any of the binder resins listed above and resins widely used for toners in the related art. Examples of the binder resins used in the pulverization process specifically include polystyrene, styrene-butyl acrylate copolymers, polyester resins, epoxy resins, and the like.

(Colored Resin Particles)

The colored resin particles are prepared through (A) Suspension polymerization process or (B) Pulverization process above.

The colored resin particles forming a toner will now be described. The colored resin particles described below comprise both colored resin particles of a core-shell type and those of a non-core-shell type.

From the viewpoint of image reproductivity, the volume average particle size Dv of the colored resin particles is preferably 3 to 15 μm, more preferably 4 to 12 μm, still more preferably 5 to 8 μm. If the colored resin particles have a volume average particle size Dv below this range, the resulting toner may have reduced fluidity, facilitating degradation of image quality due to fogging or the like in some cases. In contrast, if the colored resin particles have a volume average particle size Dv beyond this range, the resolutions of the resulting images may be reduced in some cases.

The particle size distribution (Dv/Dn), which is the ratio of the volume average particle size (Dv) of the colored resin particles to the number average particle diameter (Dn) thereof, is preferably 1.00 to 1.30, more preferably 1.00 to 1.20 from the viewpoint of image reproductivity. If the colored resin particles have a particle size distribution (Dv/Dn) beyond this range, the resulting toner may have reduced fluidity, facilitating degradation of image quality due to fogging or the like in some cases. The volume average particle size Dv and the number average particle diameter Dn of the colored resin particles can be measured using a particle size analyzer (available from Beckman Coulter, Inc., trade name: Multisizer) or the like, for example.

From the viewpoint of image reproductivity, the colored resin particles have an average circularity of preferably 0.960 to 1.000, more preferably 0.970 to 1.000, still more preferably 0.980 to 1.000.

To provide more favorable hot offset properties and low-temperature fixing properties, the gel content (tetrahydrofuran insolubles content) of the colored resin particles is preferably 1 to 50% by weight, more preferably 5 to 47% by weight, still more preferably 10 to 45% by weight, particularly preferably 15 to 40% by weight.

The colored resin particles have a weight average molecular weight (Mw) of preferably 20,000 to 200,000, more preferably 30,000 to 180,000, still more preferably 35,000 to 150,000, particularly preferably 40,000 to 90,000.

The colored resin particles described above may be used as a toner as they are or as a mixture of the colored resin particles and carrier particles (such as ferrite and iron powder). To adjust the charging properties, fluidity, storage properties, and the like of the toner, using a high speed stirrer (such as an FM mixer (trade name, available from NIPPON COKE & ENGINEERING CO., LTD.)), an external additive may be added to and mixed with the colored resin particles to prepare a one-component toner. Furthermore, the colored resin particles and an external additive may be mixed further with carrier particles to prepare a two-component toner.

The stirrer for performing an external addition treatment is not particularly limited as long as it is a stirrer that can cause an external additive to adhere to the surfaces of the colored resin particles. For example, external addition can be perfored using a stirrer enabling mixing with stirring, such as an FM mixer (trade name, available from NIPPON COKE & ENGINEERING CO., LTD.), a SUPERMIXER (trade name, available from Kawata MFG, Co., Ltd.), a Q mixer (trade name, available from NIPPON COKE & ENGINEERING CO., LTD.), a MECHANO FUSION system (trade name, available from Hosokawa Micron Coiporation), and a Mechano Mill (trade name, available from Okada Seiko Co., Ltd.).

Examples of the external additive include inorganic fine particles of silica, titanium oxide, aluminum oxide, zinc oxide, tin oxide, calcium carbonate, calcium phosphate, cerium oxide, and the like; organic fine particles of polymethyl methacrylate resins, silicone resins, melamine resins, and the like. Among these, preferred are inorganic fine particles, more preferred are silica and titanium oxide, and particularly preferred is silica. It is preferred that a combination of two or more fine particles be used as the external additive. These external additives may be used alone, and a combined use thereof is preferred.

Desirably, the proportion of the external additive to be used is preferably 0.3 to 6 parts by mass, more preferably 1.2 to 3 parts by mass relative to 100 parts by mass of the colored resin particles.

The toner according to the present invention comprises the colored resin particles and the external additive added thereto, the colored resin particles containing the aromatic vinyl thermoplastic elastomer having a polymerizable unsaturated bond as well as the binder resin, the colorant, and the release agent. Such a toner according to the present invention has high storage stability, excellent low-temperature fixing properties, and high hot offset resistance, and enables effective suppression of generation of ultrafine particles (UFPs). Thus, the toner can sufficiently meet recent demands such as a reduction in energy consumption and an increase in printing speed.

EXAMPLES

Hereinafter, the present invention will be more specifically described by way of Examples and Comparative Examples, but the present invention will not be limited only to these Examples. To be noted, "part(s)" and "%" are mass-based unless otherwise specified.

The test methods performed in Examples and Comparative Examples are as described below.

(1) Weight Average Molecular Weights of Block Copolymers in Aromatic Vinyl Thermoplastic Elastomer The weight average molecular weight was determined as a molecular weight against polystyrene standards obtained in measurement by high performance liquid chromatography using tetrahydrofuran at a flow rate of 0.35 ml/min as a carrier. The apparatus used was HLC8220 available from Tosoh Corporation, and three connected Shodex (registered trademark) KF-404HQ columns available from Showa Denko K.K. (column temperature: 40° C.) were used. A differential refractometer and an ultraviolet detector were used as detectors, and the molecular weight was calibrated against 12 points of standard polystyrenes (from 500 to 3000000) available from Polymer Laboratories Ltd.

(2) Contents of Block Copolymers in Aromatic Vinyl Thermoplastic Elastomer

The contents of the block copolymers were determined from the ratios of the areas of the peaks corresponding to the block copolymers in the chart obtained by high performance liquid chromatography above.

(3) Weight Average Molecular Weight of Styrene Polymer Block of Each of Block Copolymers Forming Aromatic Vinyl Thermoplastic Elastomer According to the method described in Rubber Chem. Technol., 45, 1295 (1972), the isoprene polymer block of each block copolymer was decomposed by reacting the block copolymer with ozone, followed by reduction with lithium aluminum hydride. Specifically, the following procedure was performed. Namely, 300 mg of a sample was dissolved in a reaction vessel containing 100 ml of dichloromethane treated with a molecular sieve. This reaction vessel was placed into a cooling tank, and was cooled to −25° C. Thereafter, while oxygen was flowing into the reaction vessel at a flow rate of 170 ml/min, ozone generated by an ozone generator was introduced. After 30 minutes had passed from the start of the reaction, it was continued that the reaction had been completed by introducing the gas flowing out of the reaction vessel into a potassium iodide aqueous solution. In the next step, 50 ml of diethyl ether and 470 mg of lithium aluminum hydride were placed into another reaction vessel purged with nitrogen. While the reaction vessel was being cooled with iced water, the solution reacted with ozone was slowly added dropwise to this reaction vessel. Thereafter, the reaction vessel was placed into a water bath, and was gradually heated, and the solution was refluxed at 40° C. for 30 minutes. Subsequently, while the solution was being stirred, diluted hydrochloric acid was added dropwise to the reaction vessel in small portions. The addition was continued until generation of hydrogen was hardly observed. After this reaction, a solid product formed in the solution was separated through filtration, and was extracted with 100 ml of diethyl ether for 10 minutes. The extract and the filtrate obtained from the filtration were combined, and the solvent was distilled off to yield a solid sample. The resulting sample as above was measured for the weight average molecular weight according to the above-described method of measuring the weight average molecular weight, and the measured value was defined as the weight average molecular weight of the styrene polymer block.

(4) Weight Average Molecular Weight of Isoprene Polymer Block of Each of Block Copolymers Forming Aromatic Vinyl Thermoplastic Elastomer For each of the block copolymers, the weight average molecular weight of the styrene polymer block was subtracted from the weight average molecular weight of the corresponding block copolymer. Based on the calculated value, the weight average molecular weight of the isoprene polymer block was determined.

(5) Content of Styrene Units in Block Copolymers Forming Aromatic Vinyl Thermoplastic Elastomer The content of styrene units was determined based on the ratio of intensities detected by the differential refractometer and the ultraviolet detector in the measurement by high performance liquid chromatography. To be noted, copolymers having different contents of styrene units were preliminarily prepared, and were used to create a calibration curve.

(6) Vinyl Bond Content in Isoprene Polymer Block in Block Copolymer Forming Aromatic Vinyl Thermoplastic Elastomer The vinyl bond content was determined based on proton NMR measurement.

(7) Content of Styrene Units in Aromatic Vinyl Thermoplastic Elastomer

The content of styrene units was determined based on proton NMR measurement.

(8) Melt Index of Aromatic Vinyl Thermoplastic Elastomer

The melt index was measured according to ASTM D1238 (G condition, 200° C., load: 5 kg).

(9) Volume Average Particle Size (Dv) of Colored Resin Particles

About 0.1 g of the colored resin particles was weighed, and was placed into a beaker. As a dispersant, 0.1 mL of a surfactant solution (available from FUJIFILM Corporation, trade name: DRYWELL) was added. Further, 10 to 30 mL of ISCTON II was added to the beaker, and the colored resin particles were dispersed for 3 minutes with a 20-W ultrasonic dispersing machine. Thereafter, the volume average particle size (Dv) of the colored resin particles was measured using a particle size analyzer (available from Beckman Coulter, Inc., trade name: Multisizer) under the condition that the aperture diameter was 100 μm, the medium was ISOTCN II, and the number of particles measured was 100,000 particles.

(10) Evaluation of Storage Properties of Toner 10 g of the toner was placed into a 100-mL polyethylene vessel, and the vessel was sealed. Thereafter, the vessel was immersed into a thermostat water bath set at a predetermined temperature, and was extracted therefrom after 8 hours had passed. The toner was transferred from the extracted vessel onto a 42-mesh sieve without being vibrated as much as possible, and the sieve was set on a powder analyzer (available from Hosokawa Micron Corporation, trade name: Powder Tester PT-R). The amplitude of the sieve was set to 1.0 mm, and the sieve was vibrated for 30 seconds. Thereafter, the mass of the toner left on the sieve was measured, and was defined as the mass of toner aggregates. The highest temperature (° C.) at which the mass of the toner aggregates was 0.5 g or less was defined as a storage temperature, which is an index for storage properties.

(11) Lowest Fixing Temperature of Toner

A fixing test was performed using a commercially available printer of a non-magnetic one-component developing method (printing speed: 20 ppm) modified to vary the temperature of the fixing roll. In the fixing test, a solid black (print density: 100%) image was printed, and the fixing rate of the toner was measured every time when the temperature of the fixing roll in the modified printer was varied by 5° C. Thus, the relation between the temperature and the fixing rate was determined. The fixing rate was determined by peeling of a tape from the solid black (print density: 100%) print region and calculation from the ratio of the image density after peeling to that before peeling. In other words, the image density before peeling is defined as ID (before), the image density after peeling is defined as ID (after), and the fixing rate can be calculated from the following calculation expression:

$$\text{fixing rate } (\%)=(\text{ID(after)}/\text{ID(before)})\times 100$$

Here, the peeling operation indicates a series of operations of applying an adhesive tape (available from Sumitomo 3M Limited, trade name: Scotch mending tape 810-3-18) to a portion of a test paper sheet to be measured, pressing and bonding the adhesive tape to the portion under a certain pressure, and then peeling the adhesive tape at a fixed speed in a direction along the paper sheet. The image density was measured with a reflective image densitometer (available from Gretag Macbeth GmbH, trade name: RD914).

In the fixing test, the lowest temperature of the fixing roll at which the fixing rate exceeded 80% was defined as the lowest fixing temperature of the toner.

(12) Hot Offsetting Temperature of Toner

A hot offset test was pertained by using a commercially available printer of a non-magnetic one-component developing method (printing speed: 20 ppm) modified to vary the temperature of the fixing roll. In the hot offset test, while the temperature of the fixing roll was changed from 150° C. to 220° C. by 5° C., a solid image of a 5-cm square was printed on a paper sheet (available from Xerox Holdings Corporation, trade name: Vitarity); and the presence/absence of a hot offset phenomenon that the toner was fused onto the fixing roll was visually observed.

In the hot offset test, the lowest setting temperature at which the toner was fused onto the fixing roll was defined as the hot offsetting temperature.

(13) Ultrafine Particle (UFP) Generating Temperature

A predetermined amount of the toner was heated on a heater installed inside a chamber. The ultrafine particles discharged inside the chamber were continuously measured with a fine particle counter (available from TSI Inc., type: CPC3007). In the next step, the temperature of the heater was raised from 160° C., and the total count number of observed ultrafine particles having a particle size in the range of 10 to 1,000 nm in the measurement was read in increments of 5° C. The temperature at which the total count number exceeded 10,000 particles was defined as the diffusion starting temperature (ultrafine particle (UFP) generating temperature) of the toner.

Production Example 1

23.2 kg of cyclohexane, 1.5 mmol of N,N,N',N'-tetramethylethylenediamine (hereinafter, referred to as TMEDA), and 1.70 kg of styrene were placed into a pressure-resistant reactor, and were stirred at 40° C. Under stirring, 99.1 mmol of n-butyllithium was added, and styrene was polymerized for one hour while the system was being heated to 50° C. The polymerization conversion ratio of styrene was 100% by mass. Subsequently, while the temperature was maintained at 50 to 60° C. by control, 6.03 kg of isoprene was continuously added to the reactor over one hour. After the addition of isoprene was completed, polymerization was performed for another one hour to form a styrene-isoprene diblock copolymer B (copolymer B represented by Ar-D). The polymerization conversion ratio of isoprene was 100%. In the next step, 15.0 mmol of dimethyldichlorosilane as a coupling agent was added to cause a coupling reaction for 2 hours. Thereby, a styrene-isoprene-styrene triblock copolymer (copolymer A represented by Ar-D-Ar) was famed. Thereafter, 198 mmol of methanol as a polymerization terminator was added, and was sufficiently mixed to terminate the reaction. Thereby, a reaction solution containing a block copolymer composition (al) was prepared. Part of the resulting reaction solution was extracted to determine the weight average molecular weights of the block copolymers, that of the entire block copolymer composition, the proportions of the contents thereof, and the vinyl bond content. The results are shown in Table 1. Subsequently, 0.3 parts of 2,6-di-tert-butyl-p-cresol as an antioxidant was added to and mixed with 100 parts of the resulting reaction solution (containing 30 parts of the polymer components), and a small amount of the mixed solution was added dropwise to hot water heated to 85 to 95° C. The solvent was volatilized to obtain a precipitate. The precipitate was crushed, and was dried at 85° C. with hot air to recover a block copolymer composition (al). The block copolymer composition (al) was measured for the melt index. The result is shown in Table 1.

Production Example 2, Production Example of Acrylic Resin 200 parts of toluene was placed into a reaction vessel, and the inside of the reaction vessel was sufficiently purged with nitrogen while toluene was being stirred. Thereafter, the system was heated to 90° C., and a mixed solution of 95 parts of methyl methacrylate, 4.6 parts of n-butyl acrylate, 0.4 parts of acrylic acid, and 2.8 parts of t-butyl peroxy-2-ethylhexanoate (available from NOF Corporation, trade name: Perbutyl 0) was added dropwise to the reaction vessel over 2 hours. Furthermore, the system was kept for 10 hours under refluxing of toluene to complete polymerization, and the solvent was distilled away under reduced pressure. Thus, an acrylic resin (Tg: 70° C., acid value: 2.5, weight average molecular weight (Mw): 11000) was yielded.

TABLE 1

| Type | Production Example 1 (α1) |
|---|---|
| Styrene-isoprene-styrene triblock copolymer A | |
| Weight average molecular weight of styrene-isoprene-styrene triblock copolymer A | 218,000 |
| Weight average molecular weight of styrene block | 17,000 |
| Content of styrene units [%] in styrene-isoprene-styrene triblock copolymer A | 22 |
| Vinyl bond content [mol %] in isoprene block | 7 |
| Weight average molecular weight of isoprene block | 184,000 |
| Styrene-isoprene diblock copolymer B | |
| Weight average molecular weight of styrene-isoprene diblock copolymer B | 109,000 |
| Weight average molecular weight of styrene block | 17,000 |
| Content of styrene units [%] in styrene-isoprene diblock copolymer B | 22 |
| Vinyl bond content [mol %] in isoprene block | 7 |
| Weight average molecular weight of isoprene block | 92,000 |
| Entire block copolymer composition | |
| Weight average molecular weight of entire block copolymer composition | 142,000 |
| Content of styrene units [%] | 22 |
| Vinyl bond content [mol %] in isoprene block | 7 |
| Proportion [%] of styrene-isoprene-styrene triblock copolymer A | 30 |
| Proportion [%] of styrene-isoprene diblock copolymer B | 70 |
| Proportion [%] of 3- and 4-branched styrene-isoprene block copolymers C and D | — |
| Melt index [g/10 min] G condition | 10 |

Example 1

75.5 parts of styrene and 24.5 parts of n-butyl acrylate as monovinyl monomers, 7 parts of carbon black (available from Mitsubishi Chemical Corporation, trade name: #25B) as a colorant, 0.6 parts of divinylbenzene as a cross-linkable polymerizable monomer, 1.2 parts of t-dodecylmercaptan as a molecular weight modifier, and 1 part of the acrylic resin prepared in Production Example 2 were wet grounded using a medium type wet grinder, and 1 part of a charge control resin (styrene/acrylic resin containing a quaternary ammonium salt as a functional group, proportion of a copolymerized monomer containing a functional group of a quaternary ammonium salt: 2%) as a charge control agent, 20 parts of stearic acid triglyceride (number average molecular weight (Mn): 890, an ester compound having a glycerol skeleton) as a release agent, and 2 parts of the block copolymer composition (al) prepared in Production Example 1 as the aromatic vinyl thermoplastic elastomer were added and mixed to prepare a polymerizable monomer composition.

On the other hand, in a stirring tank, under stirring at room temperature, an aqueous solution of 4.1 parts of sodium hydroxide (alkali metal hydroxide) dissolved in 50 parts of deionized water was gradually added to an aqueous solution of 7.4 parts of magnesium chloride (water-soluble polyvalent metal salt) dissolved in 250 parts of deionized water. Thereby, a magnesium hydroxide colloid (poorly water-soluble metal hydroxide colloid) dispersion was prepared.

On the other hand, 2 parts of methyl methacrylate as a polymerizable monomer for the shell and 65 parts of deionized water were finely dispersed with an ultrasonic emulsifying machine to prepare an aqueous dispersion of the polymerizable monomer for the shell.

The polymerizable monomer composition was added to the magnesium hydroxide colloid dispersion prepared above, followed by stirring until droplets were stabilized. Then, 6 parts of t-butyl peroxyisobutyrate (available from NOF CORPORATION, trade name: Perbutyl IB) as a polymerization initiator was added thereto, and droplets of the polymerizable monomer composition were formed by dispersing the polymerizable monomer composition while being circulated with high shear stirring at a number of rotations of 15,000 rpm using an in-line type emulsion dispersing machine (available from Pacific Machinery & Engineering Co., Ltd., trade name: Milder).

In the next step, 1 part of sodium tetraborate decahydrate was added to the aqueous dispersion of the polymerizable monomer composition formed into droplets. The aqueous dispersion was placed into a reactor provided with a stirring blade, and the system was heated to 85° C. to cause polymerization. After the polymerization conversion ratio reached substantially 100%, the aqueous dispersion of the polymerizable monomer for the shell prepared above and 0.3 parts of 2,2'-azobis(2-methyl-N-(2-hydroxyethyl)-propionamide) (available from Wako Pure Chemical Industries, Ltd., trade name: VA-086, water-soluble) as a polymerization initiator for the shell were added to the reactor. The polymerization was further continued for 4 hours, and the system was cooled with water to terminate the reaction. Thus, an aqueous dispersion of colored resin particles having a core-shell structure was prepared.

The aqueous dispersion of the colored resin particles was washed with dilute sulfuric acid (25° C., for 10 minutes) to adjust the pH to 4.5 or less. In the next step, water was separated through filtration, and 200 parts of fresh deionized water was added to prepare a slurry again. The slurry was repeatedly subjected to a water washing treatment (washing, filtration, and dehydration) at room temperature (25° C.). Then, the resulting solids were separated through filtration, and were dried in vacuum to prepare dry colored resin particles.

As external additives, 0.5 parts of silica fine particles hydrophobized with cyclic silazane and having a number average primary particle size of 7 nm and 1 part of silica fine particles hydrophobized with amino-modified silicone oil and having a number average primary particle size of 35 nm were added to 100 parts of the colored resin particles prepared above, and these particles were mixed with stirring using a high speed stirrer (available from NIPPON COKE & ENGINEERING CO., LTD., trade name: FM mixer) to perform external addition. Thus, an electrostatic image development toner in Example 1 was prepared, and was fed to the tests. The results are shown in Table 2.

Example 2

An electrostatic image development toner in Example 2 was prepared in the same manner as in Example 1 except that 20 parts of stearic acid triglyceride was replaced by 20 parts of behenic acid triglyceride (number average molecular weight (Mn): 1060, an ester compound having a glycerol skeleton), and was fed to the tests. The results are shown in Table 2.

Example 3

An electrostatic image development toner in Example 2 was prepared in the same manner as in Example 1 except that 20 parts of stearic acid triglyceride was replaced by 20 parts of palmitic acid triglyceride (number average molecular weight (Mn): 806, an ester compound having a glycerol skeleton), and was fed to the tests. The results are shown in Table 2.

Example 4

An electrostatic image development toner in Example 4 was prepared in the same manner as in Example 2 except that the compounding amount of behenic acid triglyceride was changed from 20 parts to 12 parts, and was fed to the tests. The results are shown in Table 2.

Example 5

An electrostatic image development toner in Example 5 was prepared in the same manner as in Example 2 except that the compounding amount of behenic acid triglyceride was changed from 20 parts to 25 parts, and was fed to the tests. The results are shown in Table 2.

Example 6

An electrostatic image development toner in Example 6 was prepared in the same manner as in Example 2 except that the compounding amount of the block copolymer composition (al) prepared in Production Example 1 was changed from 2 parts to 5 parts, and was fed to the tests. The results are shown in Table 2.

Example 7

An electrostatic image development toner in Example 7 was prepared in the same manner as in Example 2 except that the compounding amount of the block copolymer composition (al) prepared in Production Example 1 was changed from 2 parts to 8 parts, and was fed to the tests. The results are shown in Table 2.

Comparative Example 1

An electrostatic image development toner in Comparative Example 1 was prepared in the same manner as in Example 1 except that the block copolymer composition (al) prepared in Production Example 1 was not used, and was fed to the tests. The results are shown in Table 2.

Comparative Example 2

An electrostatic image development toner in Comparative Example 2 was prepared in the same manner as in Example 2 except that the block copolymer composition (al) prepared in Production Example 1 was not used, and was fed to the tests. The results are shown in Table 2.

Comparative Example 3

An electrostatic image development toner in Comparative Example 3 was prepared in the same manner as in Example 1 except that 20 parts of stearic acid triglyceride was replaced by 20 parts of pentaerythritol tetrapalmitate (number average molecular weight (Mn): 1090, an ester compound having a pentaerythritol skeleton) and the block copolymer composition (al) prepared in Production Example 1 was not used, and was fed to the tests. The results are shown in Table 2.

Comparative Example 4

An electrostatic image development toner in Comparative Example 4 was prepared in the same manner as in Example 1 except that 20 parts of stearic acid triglyceride was replaced by 20 parts of pentaerythritol tetrapalmitate (number average molecular weight (Mn): 1090, an ester compound having a pentaerythritol skeleton), and was fed to the tests. The results are shown in Table 2.

Comparative Example 5

An electrostatic image development toner in Comparative Example 5 was prepared in the same manner as in Example 1 except that 20 parts of stearic acid triglyceride was replaced by 20 parts of behenyl stearate (number average molecular weight (Mn): 592, an ester compound having a monoalcohol skeleton), and was fed to the tests. The results are shown in Table 2.

TABLE 2

| | | | Example | | | | | | | Comparative Example | | | | |
|---|---|---|---|---|---|---|---|---|---|---|---|---|---|---|
| | | | 1 | 2 | 3 | 4 | 5 | 6 | 7 | 1 | 2 | 3 | 4 | 5 |
| Polymerizable monomers | Styrene | (parts) | 75.5 | 75.5 | 75.5 | 75.5 | 75.5 | 75.5 | 75.5 | 75.5 | 75.5 | 75.5 | 75.5 | 75.5 |
| | n-Butyl acrylate | (parts) | 24.5 | 24.5 | 24.5 | 24.5 | 24.5 | 24.5 | 24.5 | 24.5 | 24.5 | 24.5 | 24.5 | 24.5 |
| | Divinylbenzene | (parts) | 0.6 | 0.6 | 0.6 | 0.6 | 0.6 | 0.6 | 0.6 | 0.6 | 0.6 | 0.6 | 0.6 | 0.6 |
| Release agent | Stearic acid triglyceride | (parts) | 20 | — | — | — | — | — | — | 20 | — | — | — | — |
| | Behenic acid triglyceride | (parts) | — | 20 | — | 12 | 25 | 20 | 20 | — | 20 | — | — | — |
| | Palmitic acid triglyceride | (parts) | — | — | 20 | — | — | — | — | — | — | — | — | — |
| | Pentaerythritol tetrapalmitate | (parts) | — | — | — | — | — | — | — | — | — | 20 | 20 | — |
| | Behenyl stearate | (parts) | — | — | — | — | — | — | — | — | — | — | — | 20 |
| Styrene thermoplastic elastomer | Block copolymer composition (α1)*1) | (parts) | 2 | 2 | 2 | 2 | 2 | 5 | 8 | — | — | — | 2 | — |
| Volume average particle size (Dv) of colored resin particles | | (μm) | 6.0 | 6.5 | 6.7 | 6.2 | 6.9 | 6.7 | 6.9 | 6.8 | 6.8 | 6.8 | 6.7 | 6.4 |
| Storage temperature of toner | | (° C.) | 58 | 59 | 59 | 60 | 58 | 59 | 60 | 58 | 58 | 55 | 55 | 57 |
| Lowest fixing temperature of toner | | (° C.) | 125 | 125 | 125 | 130 | 120 | 125 | 130 | 135 | 135 | 125 | 130 | 125 |
| Hot offsetting temperature of toner | | (° C.) | 200 | 210 | 200 | 190 | 210 | 210 | 215 | 215 | 215 | 190 | 190 | 205 |
| Ultrafine particle (UFP) generating temperature | | (° C.) | 185 | 195 | 180 | 200 | 190 | 195 | 195 | 195 | 195 | 195 | 195 | 170 |

*1)Block copolymer composition (α1) is a composition comprising a styrene-isoprene diblock copolymer and a styrene-isoprene-styrene triblock copolymer.

Table 2 shows that in the toners in Examples 1 to 7 prepared from the colored resin particles containing the aromatic vinyl thermoplastic elastomer having a polymerizable unsaturated bond as well as the binder resin, the colorant, and the release agent, and using the ester compound having a glycerol skeleton as the release agent, the storage temperature was high, the storage stability was excellent, the lowest fixing temperature was reduced, the low-temperature fixing properties were excellent, the hot offsetting temperature was also high, the hot offset resistance was high, the ultrafine particle (UFP) generating temperature was high, and generation of ultrafine particles (UFPs) was effectively suppressed. For the colored resin particles forming the toners in Examples 1 to 7, the state of the ester compound having a glycerol skeleton as the release agent present in the colored resin particles was observed in cross-sectional SEM and TEM images thereof. It was verified that the ester compound having a glycerol skeleton as the release agent was homogeneously finely dispersed. FIG. 1(A) shows an SEM photograph (secondary electron image) of cross-sections of colored resin particles in Example 1.

In contrast, in the toners in Comparative Examples 1 and 2 which contained the ester compound having a glycerol skeleton as the release agent but not the aromatic vinyl thermoplastic elastomer having a polymerizable unsaturated bond, the lowest fixing temperature was high and the low-temperature fixing properties were reduced.

In the toners in Comparative Examples 3 and 4 containing the ester compounds having a pentaerythritol skeleton as the release agent instead of the ester compound having a glycerol skeleton, the storage temperature was low, the storage stability was reduced, the hot offsetting temperature was also low, and the hot offset resistance was reduced.

Furthermore, in the toner in Comparative Example 5 containing the ester compound having a monoalcohol skeleton as the release agent instead of the ester compound having a glycerol skeleton, the ultrafine particle (UFP) generating temperature was low and ultrafine particles (UFPs) were readily generated.

Figure 1B:
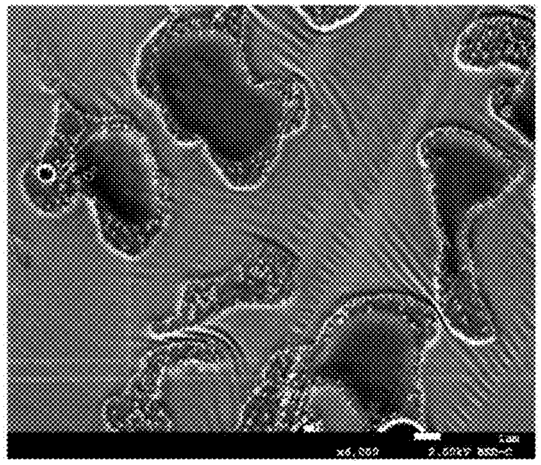
FIG. 1(B) shows an SEM photograph (secondary electron image) of cross-sections of colored resin particles in Comparative Example 1.

For the colored resin particles forming the toners in Comparative Examples 1 to 5, the state of the release agent present in the colored resin particles was observed in cross-sectional SEM and TEM images thereof. It was verified that the release agent was localized near the centers of the toner particles to foil a large domain structure. FIG. 1(B) shows an SEM photograph (secondary electron image) of cross-sections of colored resin particles in Comparative Example 1.

The invention claimed is:

1. An electrostatic image development toner comprising colored resin particles and an external additive, the colored resin particles containing a binder resin, a colorant, an aromatic vinyl thermoplastic elastomer having a polymerizable unsaturated bond, and a release agent, wherein the release agent is a triester of glycerol, the binder resin is a polymer of polymerizable monomers comprising a styrene-based monomer, a (meth)acrylate monomer, and a cross-linkable polymerizable monomer, and the aromatic vinyl thermoplastic elastomer is a composition comprising a styrene-isoprene block copolymer and a styrene-isoprene-styrene block copolymer.

2. The electrostatic image development toner according to claim 1, wherein the triester of glycerol has an ester structure formed from glycerol and a monocarboxylic acid having 16 or more carbon atoms.

3. The electrostatic image development toner according to claim 1, wherein the content of the aromatic vinyl thermoplastic elastomer is 1 to 10 parts by mass relative to 100 parts by mass of the binder resin.

4. The electrostatic image development toner according to claim 1, wherein the content of the release agent is 1 to 30 parts by mass relative to 100 parts by mass of the binder resin.

5. The electrostatic image development toner according to claim 1, wherein the triester of glycerol has a number average molecular weight (Mn) of 500 to 1500.

6. The electrostatic image development toner according to claim 1, wherein the weight average molecular weight (Mw) of the aromatic vinyl thermoplastic elastomer having a polymerizable unsaturated bond is 60,000 to 350,000.

7. The electrostatic image development toner according to claim 1, wherein the melt index (MI) of the block copolymer specified by ASTM D-1238 (G condition, 200° C., 5 kg) is 1 to 1000 g/10 min.

8. The electrostatic image development toner according to claim 1, wherein the vinyl bond content of the conjugated diene polymer block is 1 to 20 mol %.

9. The electrostatic image development toner according to claim 1, wherein the weight average molecular weight (Mw) of the aromatic vinyl polymer block in the block copolymer is 10000 to 50000.

10. The electrostatic image development toner according to claim 1, wherein the weight average molecular weight (Mw) of the conjugated diene polymer block in the block copolymer is 50000 to 200000.

11. The electrostatic image development toner according to claim 1, wherein the styrene-isoprene block copolymer is contained in a proportion of 10 to 90% by mass in the composition.

12. The electrostatic image development toner according to claim 1, wherein the styrene-isoprene-styrene block copolymer is contained in a proportion of 10 to 90% by mass in the composition.

13. The electrostatic image development toner according to claim 1, wherein the cross-linkable polymerizable monomer is an aromatic divinyl compound.

14. The electrostatic image development toner according to claim 1, wherein the proportion of cross-linkable polymerizable monomer units in the binder resin is 0.1 to 5% by mass.

15. The electrostatic image development toner according to claim 1, wherein the proportion of styrene-based monomer units contained in the binder resin is 60 to 85% by mass.

16. The electrostatic image development toner according to claim 1, wherein the proportion of (meth)acrylate monomer units is 20 to 40% by mass.

* * * * *